US012764802B2

(12) United States Patent
Hong

(10) Patent No.: US 12,764,802 B2
(45) Date of Patent: *Oct. 13, 2026

(54) METHOD AND APPARATUS FOR SELECTING NETWORK SLICE ADMISSION CONTROL FUNCTION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 354 days.

This patent is subject to a terminal disclaimer.

(21) Appl. No.: 18/291,518

(22) PCT Filed: Jul. 27, 2021

(86) PCT No.: PCT/CN2021/108773

§ 371 (c)(1),
(2) Date: Jan. 23, 2024

(87) PCT Pub. No.: WO2023/004606

PCT Pub. Date: Feb. 2, 2023

(65) Prior Publication Data

US 2024/0340977 A1 Oct. 10, 2024

(51) Int. Cl.
*H04W 76/10* (2018.01)
*H04W 48/18* (2009.01)

(52) U.S. Cl.
CPC ........... *H04W 76/10* (2018.02); *H04W 48/18* (2013.01)

(58) Field of Classification Search
CPC ....... H04W 76/10; H04W 48/18; H04W 8/00; H04W 48/20; H04W 60/06
See application file for complete search history.

(56) References Cited

U.S. PATENT DOCUMENTS

2021/0211974 A1* 7/2021 Prabhakar ........... H04L 41/0895

FOREIGN PATENT DOCUMENTS

CN 113079564 A 7/2021

OTHER PUBLICATIONS

3rd Generation Partnership Project; Technical Specification Group Services and System Aspects; System architecture for the 5G System (5GS) ; Stage 2 (Release 17) vol. SA WG2, No. V17.1.0 Jun. 24, 2021 (Jun. 24, 2021), pp. 1-526, XP052029599, (Year: 2021).*

European Patent Application No. 21951221.7, Search Report and Opinion dated Aug. 21, 2024, 11 pages.

(Continued)

*Primary Examiner* — Cheikh T Ndiaye
(74) *Attorney, Agent, or Firm* — Cozen O'Connor

(57) ABSTRACT

A method for selecting a network slice admission control function (NSACF) performed by an access and mobility management function (AMF), including: selecting the NSACF based on service capabilities of the NSACF. The service capabilities include at least one of: a first service capability that supports monitoring a number of registered user equipments (UEs) of a network slice, and a second service capability that supports monitoring a number of established protocol data unit (PDU) sessions of the network slice.

20 Claims, 5 Drawing Sheets

(56) References Cited

OTHER PUBLICATIONS

3rd Generation Partnership Project; Technical Specification Group Services and System Aspects; System architecture for the 5G System (5GS); Stage 2(Release 17), 3GPP TS 23.501, Jun. 2021, 526 pages.
Huawei, et al. "Network Slice Access Control Functionalities and Services" 3GPP TSG-WG SA2 Meeting #143E, S2-210XXX, Feb.-Mar. 2021, 4 pages.
3rd Generation Partnership Project; Technical Specification Group Services and System Aspects; Procedures for the 5G System (5GS); Stage 2(Release 17), 3GPP TS 23.502, Jun. 2021, 692 pages.
Chinese Patent Application No. 202180002124.1, Office Action with English translation dated Jun. 28, 2025, 22 pages.
NTT DOCOMO "NSACF discovery and selection" 3GPP TSG-SA WG2 Meeting #145E e-meeting, S2-2104901, May 2021, 10 pages.
Lenovo et al. "NSAC in case of mobility with AMF change" 3GPP TSG-WG SA2 Meeting #144E (e-meeting), S2-2102932, Apr. 2021, 19 pages.
CATT "Updates of NSACF discovery and selection" 3GPP TSG-SA WG2 Meeting #145E e-meeting, S2-2104411, May 2021, 3 pages.
PCT/CN2021/108773, International Search Report dated Apr. 26, 2022, 2 pages.
3rd Generation Partnership Project; Technical Specification Group Services and System Aspects; Study on enhancement of network slicing; Phase 2 (Release 17) V0.4.0, Jun. 2020; 143 pages.

* cited by examiner

METHOD AND APPARATUS FOR SELECTING NETWORK SLICE ADMISSION CONTROL FUNCTION

CROSS-REFERENCE TO RELATED APPLICATION

This application is a U.S. national phase application of International Application No. PCT/CN2021/108773, filed Jul. 27, 2021, the entire contents of which are incorporated herein by reference.

TECHNICAL FIELD

The present disclosure relates to the field of mobile communication technology, and more particularly, to a method and apparatus for selecting a network slice admission control function (NSACF).

BACKGROUND

The network slice technology allows an operator to provide various customized networks, for example, providing networks with different functions for different functional requirements, or providing networks with different performances for different performance requirements such as latency, mobility, availability, reliability and data rate bandwidth, or providing network functions only available to specific users, such as multi-projection system users, public safety users, corporate customers, roamers, or mobile virtual network operator hosting.

Currently, the network function (NF) usually utilizes a network repository function (NRF) to perform a discovery and a selection. However, how to select an appropriate NSACF to facilitate the implementation of monitoring, statistical, and executing functions on a number of UEs and a number of slice sessions of a network slice and to support and optimize the implementation of functions, such as using less signaling interactions or functional interactions is still a key issue that remains to be addressed.

SUMMARY

Embodiments of a first aspect of the present disclosure provide a method for selecting an NSACF, which is performed by an access and mobility management function (AMF) and includes: selecting the NSACF based on service capabilities of the NSACF. The service capabilities include at least one of: a first service capability that supports monitoring a number of registered user equipments (UEs) of a network slice, and a second service capability that supports monitoring a number of established protocol data unit (PDU) sessions of the network slice.

In some embodiments, selecting the NSACF includes: selecting an NSACF having the first service capability and the second service capability.

In some embodiments, selecting the NSACF further includes: selecting a high-priority NSACF from a plurality of NSACFs when the plurality of NSACFs have the first service capability and the second service capability.

In some embodiments, in case that an operator service capability policy exists, selecting the NSACF includes: selecting the NSACF according to the operator service capability policy. The operator service capability policy includes at least one of: indicating to select an NSACF having required service capabilities; and indicating to select a high-priority NSACF. The required service capabilities include only the first service capability or include the first service capability and the second service capability.

In some embodiments, selecting the NSACF includes: selecting the NSACF from registered NSACFs of a network repository function (NRF). Configuration information of the registered NSACFs is stored in the NRF, and the configuration information includes single-network slice selection assistance information (S-NSSAIs) and information indicating service capabilities of the registered NSACFs.

In some embodiments, selecting the NSACF includes: selecting the NSACF from preconfigured NSACFs of the AMF. Configuration information of the preconfigured NSACFs is stored in the AMF, and the configuration information includes single-network slice selection assistance information (S-NSSAIs) and information indicating service capabilities of the registered NSACFs.

In some embodiments, the operator service capability policy is preconfigured in at least one of the AMF and the NRF.

In some embodiments, the method further includes: receiving a registration request from a UE. The registration request carries the S-NSSAIs. Selecting the NSACF based on the service capabilities of the NSACF includes: selecting the NSACF based on the service capabilities of the NSACF, in case that the S-NSSAIs carried in the registration request are included in allowed network slice selection assistance information (Allowed NSSAI) of the AMF.

In some embodiments, the method further includes: sending an availability check and update request message to the selected NSACF; and receiving an availability check and update response message from the selected NSACF, and performing a UE registration according to the availability check and update response message. The availability check and update request message includes the S-NSSAIs, a UE identification and an update flag, the update flag indicating to increase a number of registered UEs.

In some embodiments, performing the UE registration according to the availability check and update response message includes: performing a UE registration process and returning a registration acceptance message to the UE after completing the UE registration process, in case that the availability check and update response message indicates that an availability check is successful, or returning a registration rejection message to the UE, in case that the availability check and update response message indicates that an availability check is failed.

In some embodiments, the method further includes: receiving Allowed NSSAI from another AMF; and sending a state update request message to the another AMF, in case that at least one S-NSSAI in the Allowed NSSAI of the another AMF is not included in Allowed NSSAI of the AMF. The state update request message includes the at least one S-NSSAI.

Embodiments of a second aspect of the present disclosure provide a communication device, which includes: a transceiver; a memory; and a processor. The processor is connected to the transceiver and the memory respectively, and configured to control a transmission and a reception of a wireless signal of the transceiver and enable the method for selecting the NSACF according to embodiments of the first aspect above to be implemented by executing computer-executable instructions on the memory.

Embodiments of a third aspect of the present disclosure provide a non-transitory computer readable storage medium having stored therein computer-executable instructions that, when executed by a processor, enable the method for selecting the NSACF according to embodiments of the first aspect above to be implemented.

Additional aspects and advantages of present disclosure will be given in part in the following descriptions, become apparent in part from the following descriptions, or be learned from the practice of the present disclosure.

BRIEF DESCRIPTION OF THE DRAWINGS

The above and/or additional aspects and advantages of embodiments of the present disclosure will become apparent and more readily appreciated from the following descriptions on embodiments of the present disclosure made with reference to the drawings, in which.

DETAILED DESCRIPTION

Figure 1:
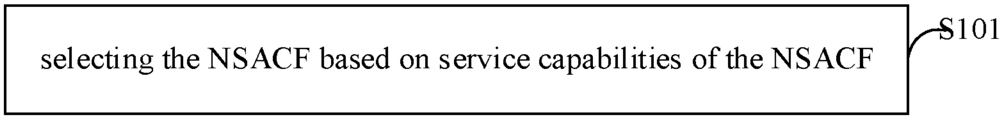
FIG. 1 is a schematic flowchart of a method for selecting an NSACF according to embodiments of the present disclosure.

Embodiments of the present disclosure will be described in detail below, and examples of embodiments are illustrated in the drawings. The same or similar elements or the elements having the same or similar functions are denoted by like reference numerals throughout the descriptions. Embodiments described herein with reference to drawings are explanatory, serve to explain the present disclosure, and cannot be construed to limit embodiments of the present disclosure.

The network slice technology allows an operator to provide various customized networks for services requiring different functions in term of such as priority, charging, policy control, security, and mobility, services requiring different performances in term of such as latency, mobility, availability, reliability and data rate, or services only available for specific users like multi-projection system users, public safety users, corporate customers, roamers, or mobile virtual network operator hosting.

The network slice may provide complete network functions, including a wireless access network function, a core network function and an IP multimedia subsystem (IMS) function, etc. One network may support one or more network slices. Differences exist between network slices due to differences in supported network functions and performances. A network slice instance means an instantiation of the network slice, that is, a set of deployed network functions that deliver intended network slice services according to a network slice template.

Features and network function optimizations supported by network slices may be different, and network slices may have different single-network slice selection assistance information (S-NSSAI) to identify different slice or service types, which have different slice/service types.

The operator may deploy a plurality of network slices for different groups or categories of UEs that provide same functions, for example, they deliver services with different service characteristics, or provide user-specific networks. In this scenario, slices may be of a same type, but identified with different S-NSSAIs.

The selection of a set of network slice instances for a UE is usually triggered by a first access and mobility management function (AMF) in a registration process. The AMF interacts with a network slice selection function (NSSF). A slice selection may result in a reselection of the AMF. A PDU session belongs to one and only one specific network slice instance in a public land mobile network (PLMN). Although different network slice instances may have slice-specific PDU sessions using a same deep neural network (DNN), different network slice instances do not share a same PDU session. During a handover process, a source AMF selects a target AMF by interacting with an NF repository function (NRF).

A Network slice type (NEST) is applied to a network slice. One network slice may deploy a plurality of network slice instances. A generic network slice template (GST) defines attributes supported by the network slice, for example, 1) a number of terminals, which describes a maximum number of terminals that can use the network slice at the same time; 2) a number of connections, which describes a maximum number of concurrent sessions supported by the network slice. It is an important input in determining a size of the network slice and providing sufficient resources for the network slice.

A network slice may support a limited number of user equipments (UEs) to use the network slice simultaneously and support a limited number of concurrent sessions. In order to support a control on the number of terminals and the number of protocol data unit (PDU) sessions in the network slice, a network slice admission control function (NSACF) is introduced in a 5G communication system. For network slices subjected to the network slice admission control (NSAC), the NSACF monitors a number of registered UEs in each network slice and a number of PDU sessions in each network slice.

A plurality of NSACFs or NSACF instances may be deployed in a network. In an operator's network, it is possible to include the following different NSACF deployment options: a plurality of NSACFs are deployed for one network slice, or a plurality of NSACFs serve a plurality of network slices of a large network for a scalability purpose. A single NSACF or a plurality of NSACFs is dedicated to a specific network slice to provide customized services, such as an isolation slice. In addition, when a plurality of network slice instances are deployed in a network slice, the above option are also possible to implement.

Regarding a discovery and a selection of the NSACF, they are usually performed by a network function (NF) using a network repository function (NRF). Regarding the discovery and the selection of the NSACF, a network function in a discovery end may be performed via the NRF or via an operator's policy locally configured. This solution applies to the discovery and the selection of NSACF functions or NSACF instances. However, how to select an appropriate NSACF accurately with less signaling to facilitate the implementation of monitoring, statistical, and executing functions on the number of UEs and the number of slice sessions of a network slice and to support and optimize the implementation of functions using such as less signaling or functional interactions is still a key issue that needs to be solved urgently.

Since not all NSACFs support the same capability. For example, some NSACFs only support the admission control on the maximum number of UEs, some NSACFs only support the admission control on the maximum number of PDU sessions, or some NSACFs may support both the admission control on the maximum number of UEs and the admission control on the maximum number of PDU sessions.

However, in a current NSACF selection and discovery mechanism, different capabilities of the NSACF and different NSACF deployment options are not considered.

Therefore, purposes of the present disclosure are to: select an appropriate NSACF taking into account factors, such as not all NSACFs supporting the same capability; select an appropriate NSACF with less signaling, such as less transmission of notifications and reports on the network slice state or an NF device repositioning, etc.; and select an appropriate NSACF with a high accuracy.

The present disclosure provides a method and apparatus for selecting an NSACF, with which an AMF selects an NSACF for a network slice based on service capabilities of the NSACF, and the service capabilities include a first service capability that supports monitoring the number of registered UEs of the network slice and/or a second service capability that supports monitoring the number of established protocol data unit (PDU) sessions of the network slice, so that an appropriate NSACF can be selected accurately with less signaling.

The method and apparatus for selecting an NSACF provided by the present disclosure will be described in detail below with reference to the accompanying drawings.

FIG. 1 shows a schematic flowchart of a method for selecting an NSACF according to embodiments of the present disclosure. As shown in FIG. 1, the method may be performed by an AMF and includes a following step.

In S101, the NSACF is selected based on service capabilities of the NSACF.

The service capabilities include at least one of: a first service capability that supports monitoring the number of registered UEs of a network slice, and a second service capability that supports monitoring the number of established protocol data unit (PDU) sessions of the network slice.

The NSACF may have a variety of different service capabilities. For example, the NSACF may have a service capability that only supports monitoring the number of registered UEs of the network slice, or the NSACF may have a service capability that only supports monitoring the number of established PDU sessions of the network slice, or the NSACF may have service capabilities that support both monitoring the number of registered UEs of the network slice and monitoring the number of established PDU sessions of the network slice. In case that the selection of the NSACF is performed directly without considering the service capabilities of the NSACF, the selected NSACF may not meet needs. For example, in a UE registration scenario, in case that the AMF directly selects the NSACF for the network slice without considering the service capabilities of the NSACF, the selected NSACF may not have the service capability that supports monitoring the number of registered UEs of the network slice, that is, the selected NSACF does not meet requirements. In this case, the AMF may need to reselect an NSACF, which will lead to a complicated NSACF selection process and result in more signaling transmissions.

In embodiments of the present application, the AMF may select the NSACF for the network slice based on the service capabilities of the NSACF, so that the selection of the NSACF is performed with considering the service capabilities of the NSACF.

It should be noted that when a deployed NSACF has a plurality of NSACF instances, the method for selecting the NSACF according to embodiments of the present disclosure is also applicable, that is, an NSACF instance may be selected based on service capabilities of the NSACF instance. The specific details will not be repeated here.

With the method for selecting the NSACF according to embodiments of the present disclosure, the AMF selects the NSACF for the network slice based on the service capabilities of the NSACF, and the service capabilities include the first service capability that supports monitoring the number of registered UEs of the network slice and/or the second service capability that supports monitoring the number of established protocol data unit (PDU) sessions of the network slice, so that an appropriate NSACF can be selected accurately with less signaling.

Figure 2:
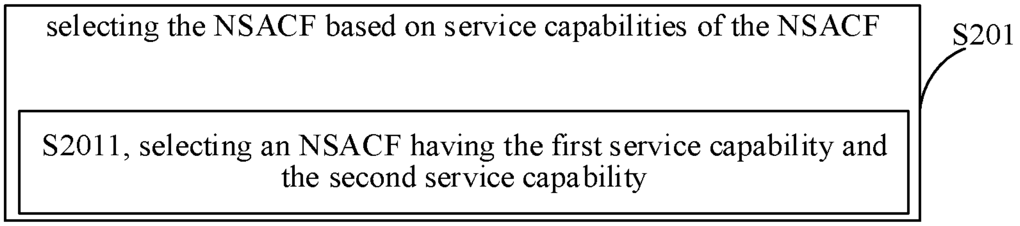
FIG. 2 is a schematic flowchart of a method for selecting an NSACF according to embodiments of the present disclosure.

FIG. 2 shows a schematic flowchart of a method for selecting an NSACF according to embodiments of the present disclosure. The method may be performed by an AMF. As shown in FIG. 2, the method may include following steps.

In S201, the NSACF is selected based on service capabilities of the NSACF.

For details of the S201, reference may be made to the descriptions of step S101 in FIG. 1, which will not be repeated here.

In this embodiment, the above step S201 may include a following step.

In S2011, an NSACF having the first service capability and the second service capability is selected.

In this embodiment, the AMF preferentially selects for the network slice an NSACF that has service capabilities that support both monitoring the number of registered UEs of the network slice and monitoring the number of established PDU sessions of the network slice.

In case that the NSACF selected by the AMF for the network slice only has the service capability that supports monitoring the number of registered UEs of the network slice, subsequently when PDU sessions are established for the network slice, the selected NSACF cannot meet a requirement for monitoring the number of established PDU sessions of the network slice. In this case, the AMF needs to reselect for the network slice an NSACF that has the service capability to support monitoring the number of established PDU sessions of the network slice, which leads to a complicated NSACF selection process and result in more signaling transmissions.

However, in this embodiment, since the AMF preferentially selects for the network slice an NSACF having the service capabilities that support monitoring both the number of registered UEs of the network slice and the number of established PDU sessions of the network slice, even if a PDU session is subsequently established for the network slice, the selected NSACF can also meet needs, thereby avoiding the complicated NSACF selection process and reducing the signaling transmissions.

With the method for selecting the NSACF according to embodiments of the present disclosure, the AMF preferentially selects the NSACF that has the service capabilities to support monitoring both the number of registered UEs of the network slice and the number of established PDU sessions of the network slice, thereby being able to avoid the complicated NSACF selection process and reduce the signaling transmissions.

Figure 3:
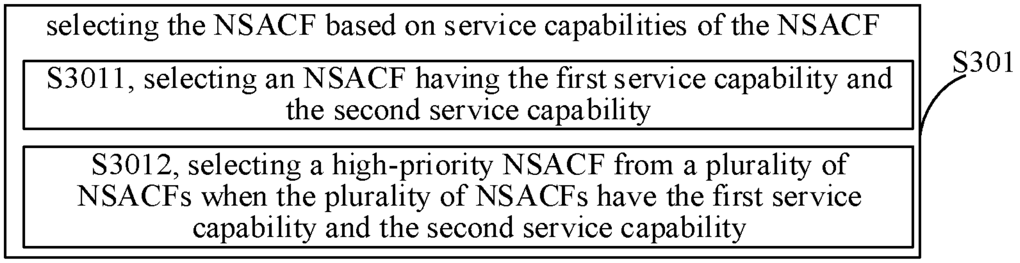
FIG. 3 is a schematic flowchart of a method for selecting an NSACF according to embodiments of the present disclosure.

FIG. 3 shows a schematic flowchart of a method for selecting an NSACF according to embodiments of the present disclosure. The method may be performed by an AMF. As shown in FIG. 3, the method may include the following steps.

In S301, the NSACF is selected based on service capabilities of the NSACF.

For details of the S301, reference may be made to the descriptions of step S101 in FIG. 1, which will not be repeated here.

In this embodiment, the above step S301 may include the following steps.

In S3011, an NSACF having the first service capability and the second service capability is selected.

For details of the S3011, reference may be made to the descriptions of step S2011 in FIG. 2, which will not be repeated here.

In S3012, a high-priority NSACF is selected from a plurality of NSACFs, when the plurality of NSACFs have the first service capability and the second service capability.

In the deployed NSACFs, there may exist a plurality of NSACFs that have both the first service capability and the second service capability, and the plurality of NSACFs that have both the first service capability and the second service capability may have different priorities, in term of factors such as deployment locations of the NSACFs.

In this embodiment, when there exist a plurality of NSACFs that have both the first service capability and the second service capability, the AMF may select an NSACF having a high priority from the plurality of NSACFs.

With the method for selecting the NSACF according to embodiments of the present disclosure, the AMF preferentially selects the NSACF that not only has the service capabilities to support monitoring both the number of registered UEs of the network slice and the number of established PDU sessions of the network slice, but also has a high priority, thereby being able to avoid a complicated NSACF selection process, reduce signaling transmissions and select a more appropriate NSACF.

Figure 4:
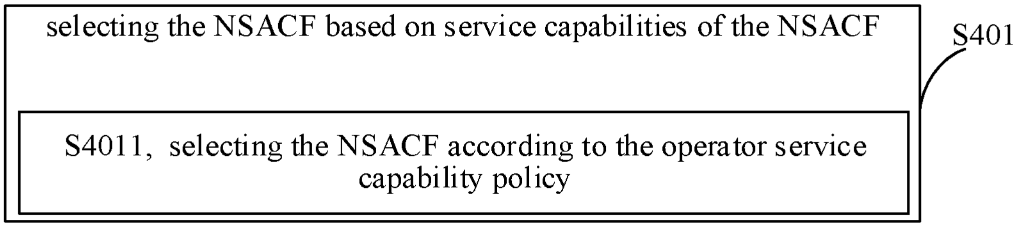
FIG. 4 is a schematic flowchart of a method for selecting an NSACF according to embodiments of the present disclosure.

FIG. 4 shows a schematic flowchart of a method for selecting an NSACF according to embodiments of the present disclosure. The method may be performed by an AMF. As shown in FIG. 4, the method may include following steps.

In S401, the NSACF is selected based on service capabilities of the NSACF.

For details of the S401, reference may be made to the descriptions of step S101 in FIG. 1, which will not be repeated here.

In this embodiment, when an operator service capability policy exists, the above step S401 may include a following step.

In S4011, the NSACF is selected according to the operator service capability policy.

The operator service capability policy includes at least one of: indicating to select an NSACF having required service capabilities; and indicating to select a high-priority NSACF. The required service capabilities include only the first service capability or include the first service capability and the second service capability.

In this embodiment, when the operator service capability policy exists, the AMF preferentially selects the NSACF for the network slice based on the operator service capability policy, so that the selected NSACF may meet the operator service capability policy.

When the operator service capability policy includes indicating to select an NSACF having the first service capability, it indicates that the operator service capability policy expects to select an NSACF having a service capability that only supports monitoring the number of registered UEs of the network slice. Therefore, based on the operator service capability policy, the AMF selects for the network slice an NSACF that has the service capability to monitor the number of registered UEs of the network slice.

When the operator service capability policy includes indicating to select an NSACF having the first service capability and indicating to select a high-priority NSACF, it indicates that the operator service capability policy expects to select an NSACF that has a service capability that only supports monitoring the number of registered UEs of the network slice and has a high priority. Therefore, based on the operator service capability policy, the AMF selects, for the network slice, NSACFs that have the service capability to monitor the number of registered UEs of the network slice, and selects an NSACF having the high priority from these NSACFs.

When the operator service capability policy includes indicating to select an NSACF having the first service capability and the second service capability, it indicates that the operator service capability policy expects to select an NSACF having service capabilities that support both monitoring the number of registered UEs of the network slice and monitoring the number of established PDU sessions of the network slice. Therefore, based on the operator service capability policy, the AMF selects for the network slice an NSACF that has the service capabilities to monitor the number of registered UEs of the network slice and monitor the number of established PDU sessions of the network slice.

When the operator service capability policy includes indicating to select an NSACF having the first service capability and the second service capability and indicating to select a high-priority NSACF, it indicates that the operator service capability policy expects to select an NSACF that has service capabilities that support both monitoring the number of registered UEs of the network slice and monitoring the number of established PDU sessions of the network slice, and has a high priority. Therefore, based on the operator service capability policy, the AMF selects, for the network slice, NSACFs that have the service capabilities to monitor the number of registered UEs of the network slice and monitor the number of established PDU sessions of the network slice, and selects an NSACF having the high priority from these NSACFs.

In some embodiments, the operator service capability policy is preconfigured in at least one of the AMF and an NRF.

The operator service capability policy is preconfigured in the AMF, and may also be preconfigured in the NRF. When the operator service capability policy is preconfigured in the NRF, the AMF may obtain the operator service capability policy by accessing the NRF.

With the method for selecting the NSACF according to embodiments of the present disclosure, in case that the operator service capability policy exists, the AMF preferentially selects the NSACF according to the operator service capability policy, so that the selected NSACF may meet the operator service capability policy.

Figure 5:
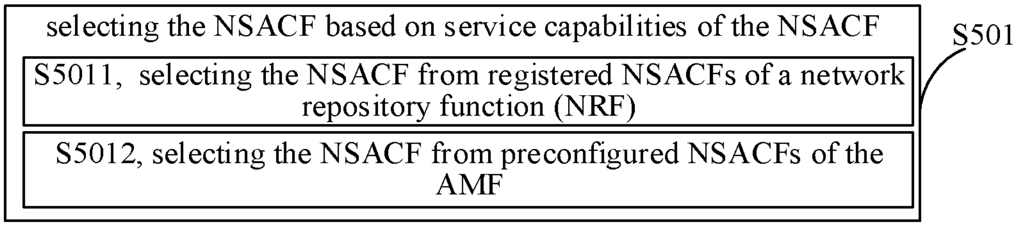
FIG. 5 is a schematic flowchart of a method for selecting an NSACF according to embodiments of the present disclosure.

FIG. 5 shows a schematic flowchart of a method for selecting an NSACF according to embodiments of the present disclosure. The method may be performed by an AMF. As shown in FIG. 5, the method may include following steps.

In S501, the NSACF is selected based on service capabilities of the NSACF.

For details of the S501, reference may be made to the descriptions of the step S101 in FIG. 1, the steps S201 and S2011 in FIG. 2, the steps S301 and S3011 to S3012 in FIG. 3, or the steps S401 and S4011 in FIG. 4, which will not be repeated here.

In this embodiment, the above step S501 may include any of the following steps.

In S5011, the NSACF is selected from registered NSACFs of a network repository function (NRF). Configuration information of the registered NSACFs is stored in the NRF, and the configuration information includes single-network slice selection assistance information (S-NSSAIs) and information indicating service capabilities of the registered NSACFs.

An NSACF may be registered in the NRF, the NSACF provides its configuration information to the NRF, and the NRF marks the NSACF as available. During a registration process of the NSACF, the NSACF provides S-NSSAIs and its service capabilities. That is, the configuration information of the NSACF registered in the NRF may include the S-NSSAIs and the information indicating its service capabilities. The AMF may utilize the NRF to discover and select an NSACF.

The S-NSSAI identifies a network slice, which is assistance information used by a network to select a specific network slice instance. The S-NSSAI may include following information: a slice/service type (SST) indicating an operation of a network slice expected from perspectives of functions and services; and a slice differentiator, which is optional information to supplement the SST for selecting a network slice instance from a plurality of potential network slice instances that all match an indicated SST.

In some embodiments, the AMF preferentially selects an NSACF having the first service capability and the second service capability from the registered NSACFs in the NRF.

For specific details on how the AMF selects the NSACF having the first service capability and the second service capability, reference may be made to the relevant descriptions of the step S2011 in FIG. 2 and the steps S3011 to S3012 in FIG. 3, which will not be repeated here.

In some embodiments, when an operator service capability policy exists, the AMF preferentially selects the NSACF from the registered NSACFs in the NRF based on the operator service capability policy.

For specific details on how the AMF selects the NSACF based on the operator service capability policy, reference may be made to the relevant descriptions of the step S4011 in FIG. 4, which will not be repeated here.

In S5012, the NSACF is selected from preconfigured NSACFs of the AMF. Configuration information of the preconfigured NSACFs is stored in the AMF, and the configuration information includes S-NSSAIs and information indicating service capabilities of the registered NSACFs.

An NSACF may be configured locally in the AMF, and the configuration information of the NSACF may indicate the service capabilities of the NSACF and the S-NSSAIs. The AMF may utilize the configuration information to discover and select the NSACF.

In some embodiments, the AMF preferentially selects the NSACF having the first service capability and the second service capability from the preconfigured NSACFs of the AMF.

For specific details on how the AMF selects the NSACF having the first service capability and the second service capability, reference may be made to the relevant descriptions of the step S2011 in FIG. 2 and the steps S3011 to S3012 in FIG. 3, which will not be repeated here.

In some embodiments, when the operator service capability policy exists, the AMF preferentially selects the NSACF from the preconfigured NSACFs of the AMF based on the operator service capability policy.

For specific details on how the AMF selects the NSACF based on the operator service capability policy, reference may be made to the relevant descriptions of the step S4011 in FIG. 4, which will not be repeated here.

With the method for selecting the NSACF according to embodiments of the present disclosure, the AMF may preferably select, locally or from the NRF, the NSACF that has the service capabilities to monitor the number of registered UEs of the network slice and monitor the number of established PDU sessions of the network slice, or preferably select, locally or from the NRF, the NSACF based on the operator service capability policy, so as to meet the operator service capability policy, avoid a complicated NSACF selection process and reduce signaling transmissions.

Figure 6:
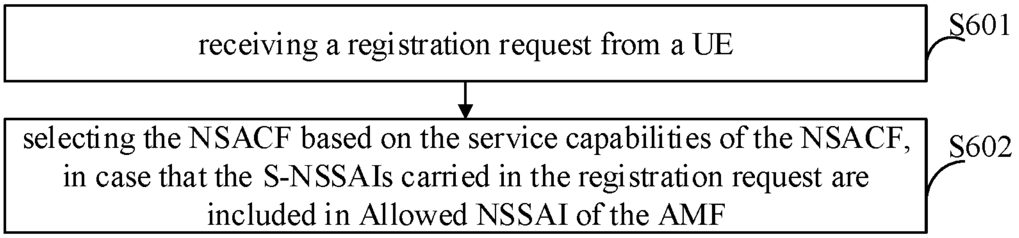
FIG. 6 is a schematic flowchart of a method for selecting an NSACF according to embodiments of the present disclosure.

FIG. 6 shows a schematic flowchart of a method for selecting an NSACF according to embodiments of the present disclosure. The method may be performed by an AMF. As shown in FIG. 6, the method may include following steps.

In S601, a registration request is received from a UE. The registration request carries the S-NSSAIs.

In S602, the NSACF is selected based on the service capabilities of the NSACF, in case that the S-NSSAI carried in the registration request is included in allowed network slice selection assistance information (Allowed NSSAI) of the AMF.

When the UE is registered to a network, the UE sends the registration request to the AMF, and the registration request will carry the S-NSSAIs. The AMF will select the NSACF based on the service capabilities of the NSACF, in case that the allowed network slice selection assistance information (Allowed NSSAI) of the AMF includes the S-NSSAI carried in the registration request. For details on how the AMF selects the NSACF based on the service capabilities of the NSACF, reference may be made to the descriptions of the step S101 in FIG. 1, the steps S201 and S2011 in FIG. 2, the steps S301 and S3011 to S3012 in FIG. 3, the steps S401 and S4011 in FIG. 4, or the steps S501 and S5011 to S5012 in FIG. 5, which will not be repeated here.

With the method for selecting the NSACF according to embodiments of the present disclosure, the AMF may perform an NSACF selection in response to the registration request of the UE.

Figure 7:
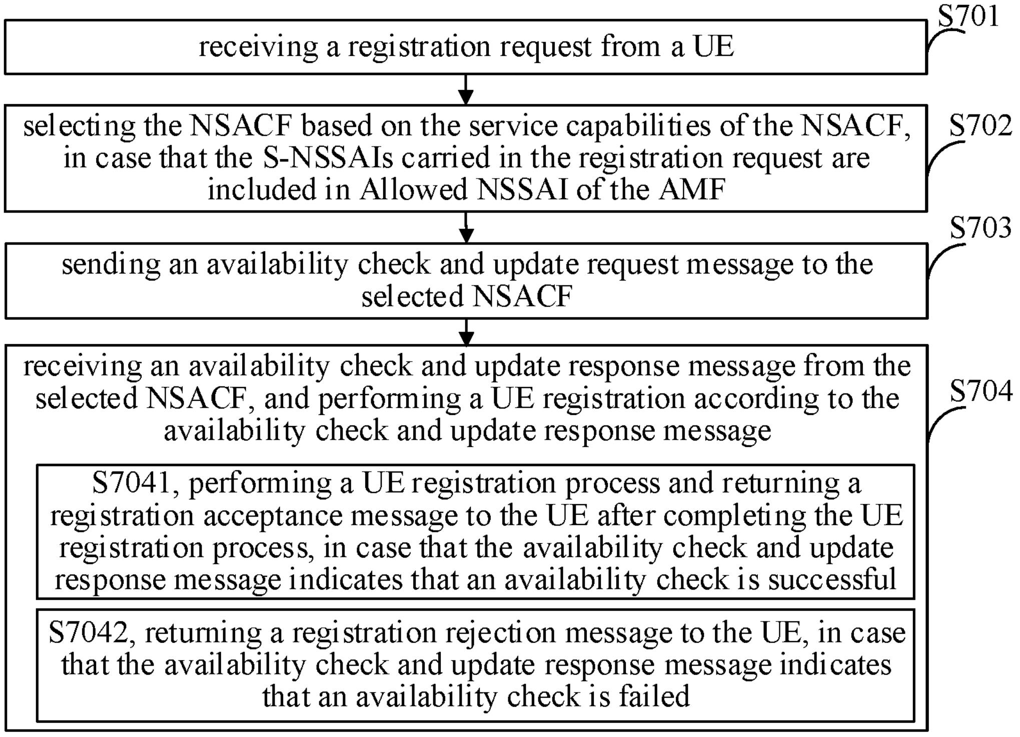
FIG. 7 is a schematic flowchart of a method for selecting an NSACF according to embodiments of the present disclosure.

FIG. 7 shows a schematic flowchart of a method for selecting an NSACF according to embodiments of the present disclosure. The method may be performed by an AMF. As shown in FIG. 7, the method may include following steps.

In S701, a registration request is received from a UE. The registration request carries the S-NSSAIs.

In S702, the NSACF is selected based on the service capabilities of the NSACF, in case that the S-NSSAIs carried in the registration request are included in allowed network slice selection assistance information (Allowed NSSAI) of the AMF.

For details of the step S702, reference may be made to the descriptions of the step S101 in FIG. 1, the steps S201 and S2011 in FIG. 2, the steps S301 and S3011 to S3012 in FIG. 3, the steps S401 and S4011 in FIG. 4, or the steps S501 and S5011 to S5012 in FIG. 5, which will not be repeated here.

In S703, an availability check and update request message is sent to the selected NSACF. The availability check and update request message includes the S-NSSAIs, a UE identification and an update flag, and the update flag indicates to increase the number of registered UEs.

After selecting the NSACF, the AMF may send the availability check and update request message to the selected NSACF, so that the NSACF may perform a check on the number of registered UEs according to the availability check and update request message.

In S704, an availability check and update response message is received from the selected NSACF, and a UE registration is performed according to the availability check and update response message.

After receiving the availability check and update request message, the NSACF performs the check on the number of registered UEs in response to the request message, and performs an update on the number of registered UEs and/or feeds back the availability check and update response message according to a result of the check. After receiving the availability check and update response message, the AMF may perform the UE registration according to the response message.

In some embodiments, the above step S704 may include the following steps.

In S7041, a UE registration process is performed and a registration acceptance message is returned to the UE after completing the UE registration process, in case that the availability check and update response message indicates that an availability check is successful.

In case that the availability check and update response message indicates that the availability check is successful, it indicates that the UE may be registered to a corresponding network slice, and the AMF performs the UE registration process based on the availability check and update response message and returns the registration acceptance message to the UE after completing the UE registration process.

In S7042, a registration rejection message is returned to the UE, in case that the availability check and update response message indicates that an availability check is failed.

In case that the availability check and update response message indicates that the availability check is failed, it indicates that the UE cannot be registered to a corresponding network slice, for example, because the number of registered UEs of the network slice has reached a maximum value, then the AMF returns the registration rejection message to the UE based on the availability check and update response message.

With the method for selecting the NSACF according to embodiments of the present disclosure, after selecting the NSACF, the AMF may monitor the number of registered UEs of the corresponding network slice through the NSACF.

Figure 8:
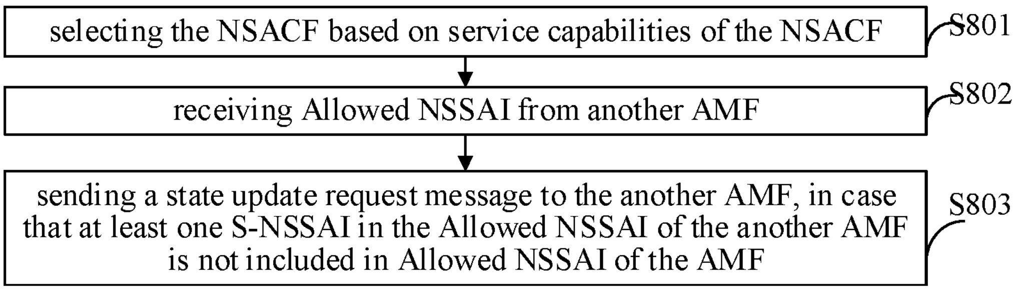
FIG. 8 is a schematic flowchart of a method for selecting an NSACF according to embodiments of the present disclosure.

FIG. 8 shows a schematic flowchart of a method for selecting an NSACF according to embodiments of the present disclosure. The method may be performed by an AMF. As shown in FIG. 8, the method may include following steps.

In S801, the NSACF is selected based on service capabilities of the NSACF.

For details of the step S801, reference may be made to the descriptions of the step S101 in FIG. 1, the steps S201 and S2011 in FIG. 2, the steps S301 and S3011 to S3012 in FIG. 3, the steps S401 and S4011 in FIG. 4, or the steps S501 and S5011 to S5012 in FIG. 5, which will not be repeated here.

In S802, Allowed NSSAI is received from another AMF.

In S803, a state update request message is sent to the another AMF, in case that at least one S-NSSAI in the Allowed NSSAI of the another AMF is not included in Allowed NSSAI of the AMF. The state update request message includes the at least one S-NSSAI.

In case that a handover from an old AMF to a new AMF occurs, the new AMF may receive the Allowed NSSAI of the old AMF from the old AMF. In case that one or more S-NSSAIs in the Allowed NSSAI of the old AMF are not supported by the new AMF, that is, they are not included in the Allowed NSSAI of the new AMF, the new AMF will send the state update request message to the old AMF, so that the old AMF may perform a state update. The state update message includes the one or more S-NSSAIs that are not supported by the new AMF.

With the method for selecting the NSACF according to embodiments of the present disclosure, after the AMF selects the NSACF, in case that a handover from another AMF to the AMF occurs, and these two AMFs have different Allowed NSSAIs, the AMF may notify the another AMF to perform the state update.

Figure 9:
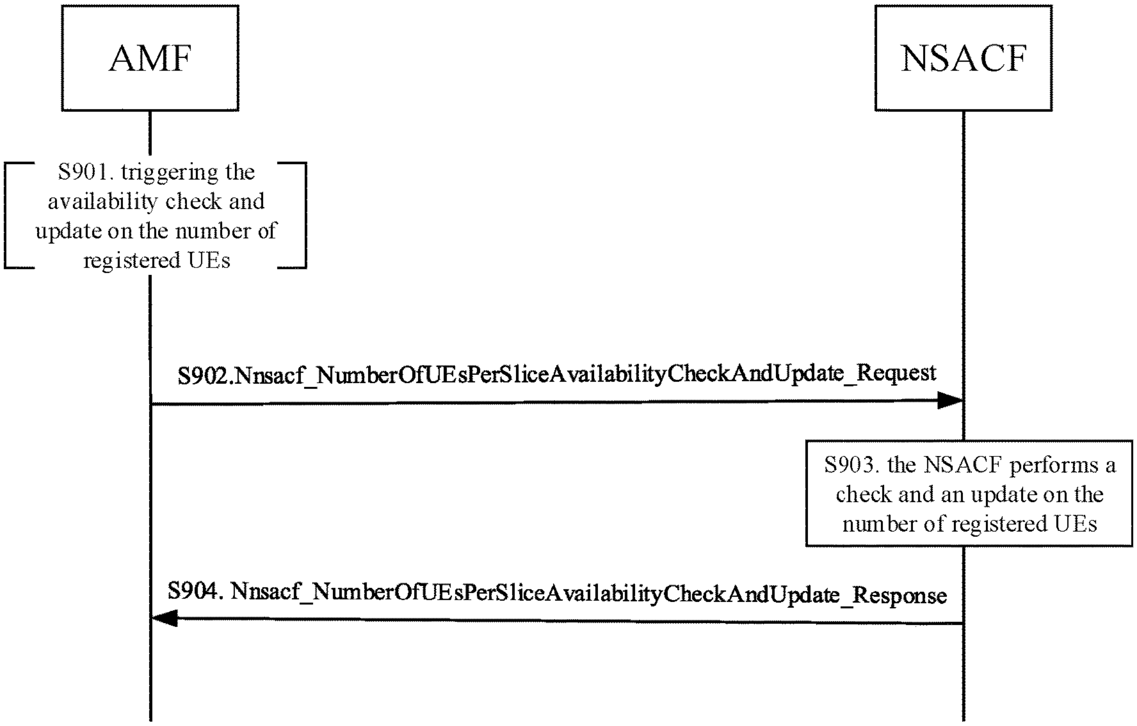
FIG. 9 is an interactive process regarding an availability check and update of a number of registered UEs according to embodiments of the present disclosure.

FIG. 9 shows an interactive process regarding a selection of an NSACF, and an availability check and update of a number of registered UEs of a slice according to embodiments of the present disclosure. As shown in FIG. 9, an AMF selects the NSACF and interacts with the NSACF to implement the availability check and update on the number of registered UEs. Specifically, it includes following processes.

In S901, the availability check and update on the number of registered UEs are triggered.

The availability check and update on the number of registered UEs may be triggered in response to a message received by the AMF from other devices, or may also be triggered by the AMF based on a certain preset triggering mechanism.

For example, the availability check and update of the number of registered UEs may be triggered in response to a registration request from a UE. In a case of UE registration, the AMF performs the selection of the NSACF for the S-NSSAI carried in the registration request based on service capabilities of the NSACF or an NSACF service capability policy of an operator. When performing the selection of the NSACF, in case that the operator service capability policy exists, the AMF preferentially selects the NSACF according to the operator service capability policy. In case that no operator service capability policy exists, the AMF preferentially selects the NSACF having the service capabilities that support both monitoring the number of registered UEs of a network slice and monitoring the number of established PDU sessions of the network slice.

The NSACF may be registered in an NRF, the NSACF provides its configuration information to the NRF, and the NRF marks the NSACF as available. During an NSACF registration process, the NSACF provides the S-NSSAIs and service capabilities of the NSACF as inputs. The AMF may utilize the NRF to select the NSACF, in case that the NSACF is registered in the NRF.

The NSACF may be configured in the AMF, and configuration information of the NSACF may indicate service capabilities of the NSACF and the S-NSSAIs. The AMF may utilize the configuration information of the NSACF in the AMF to select the NSACF, in case that the NSACF is configured in the AMF.

The operator service capability policy may include, for example, indicating to select an NSACF having the service capability that supports monitoring the number of registered UEs of the network slice, indicating to select an NSACF having the service capabilities that support monitoring the number of established PDU sessions of the network slice and support monitoring the number of registered UEs of the network slice. In addition, the operator service capability policy may also include indicating to select a high-priority NSACF.

The operator service capability policy may be preconfigured in the AMF and/or the NRF.

In another example, the availability check and update on the number of registered UEs may be triggered in response to the AMF completing a deregistration process of the UE.

In S902, the AMF sends an availability check and update request message to the selected NSACF in case that the S-NSSAI is confirmed to be included in Allowed NSSAI of the AMF.

The availability check and update request (Nnsacf_NumberOfUEsPerSliceAvailabilityCheckAndUpdate_Request) message includes a UE identification, the S-NSSAIs and an update flag. The update flag may indicate to increase the number of registered UEs when the UE will be registered to a corresponding network slice or indicate to reduce the number of registered UEs when the UE will be deregistered from a corresponding network slice or the UE will be re-registered to a corresponding network slice.

In S903, the NSACF performs a check and an update of the number of registered UEs based on the availability check and update request message provided by the AMF.

In case that the update flag in the availability check and update request message indicates to increase the number of registered UEs, and the NSACF finds that the UE identification in the availability check and update request message already exists in a list of registered UEs of a corresponding network slice, the NSACF will not increase the number of registered UEs, because the UE has been counted as registered to the corresponding network slice.

In case that the update flag in the availability check and update request message indicates to increase the number of registered UEs, the NSACF finds that the UE identification in the availability check and update request message does not exist in a list of registered UEs of a corresponding network slice, and the number of registered UEs of the corresponding network slice has not reached a maximum value, the NSACF will increase the UE identification to the list of registered UEs and increase the number of registered UEs.

In case that the update flag in the availability check and update request message indicates to increase the number of registered UEs, the NSACF finds that the UE identification in the availability check and update request message does not exist in a list of registered UEs of a corresponding network slice, and the number of registered UEs of the corresponding network slice has reached a maximum value, the NSACF will not increase the number of registered UEs, and will return a result parameter indicating that the number of registered UEs of the corresponding network slice has reached the maximum value.

In case that the update flag in the availability check and update request message indicates to reduce the number of registered UEs, the NSACF will remove the UE identification in the availability check and update request message from a list of registered UEs of a corresponding network slice and reduce the number of registered UEs.

In S904, the NSACF feeds back an availability check and update response message to the AMF.

When the NSACF finds that the number of registered UEs in a corresponding network slice has reached the maximum value, the availability check and update response (Nnsacf_NumberOfUEsPerSliceAvailabilityCheckAndUpdate_Response) message fed from the NSACF back to the AMF may include the result parameter as described above.

In the case of UE registration, the AMF will reject the registration request of the UE and return a registration rejection message to the UE, in case that for all S-NSSAIs in the registration request, the NSACF feeds back a result parameter indicating that the number of registered UEs of the network slice has reached the maximum value. The AMF will perform a UE registration process and return a registration acceptance message to the UE after completing the UE registration process, in case that for a certain S-NSSAI in the registration request, the NSACF does not feed back a result parameter indicating that the number of registered UEs of the network slice has reached the maximum value. The registration rejection message or the registration acceptance message includes, for example, rejected S-NSSAIs, rejection reasons (such as "the number of registered UEs of the corresponding network slice has reached the maximum value"), and an optional backoff time.

Figure 10:
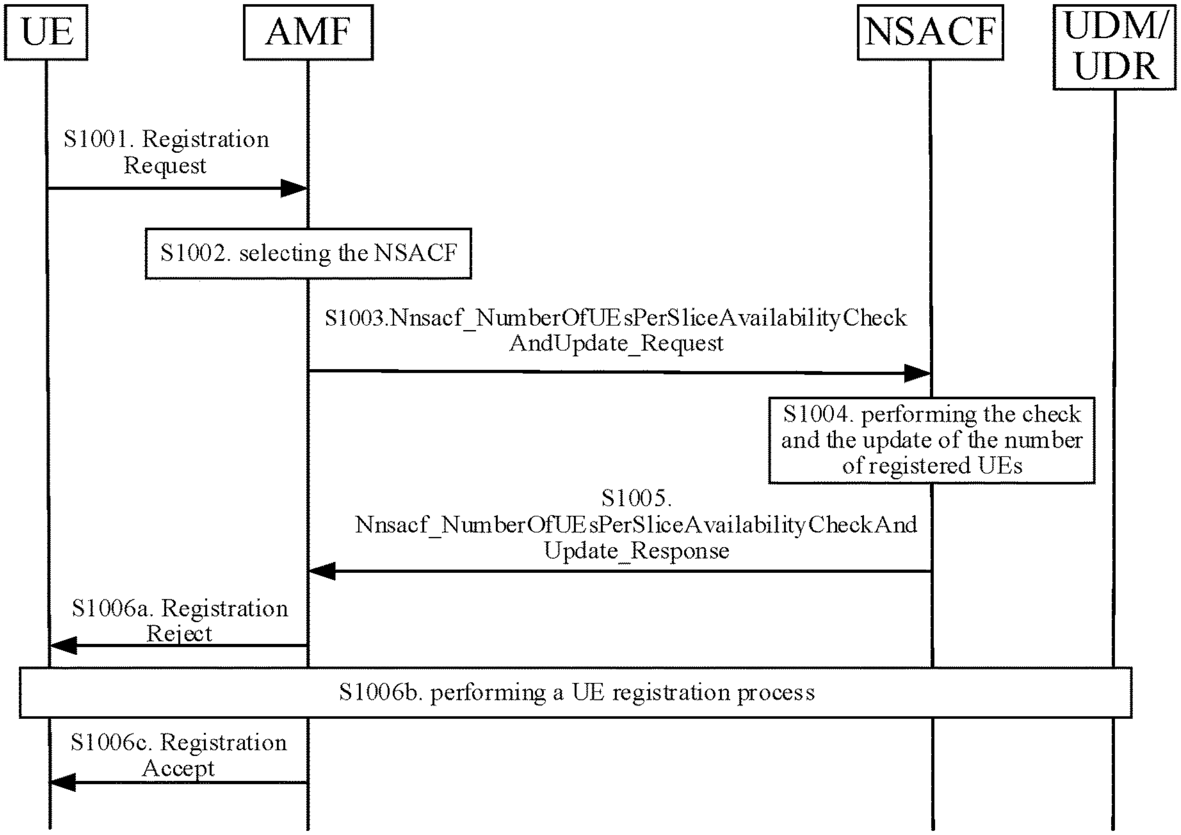
FIG. 10 is an interactive process regarding an availability check and update of a number of registered UEs in a case of UE registration according to embodiments of the present disclosure.

For example, FIG. 10 shows an interactive process regarding an availability check and update of the number of registered UEs in a case of UE registration according to embodiments of the present disclosure. As shown in FIG. 10, an AMF and an NSACF interact to implement the availability check and update on the number of registered UEs. Specifically, it includes following processes.

In S1001, a UE sends a registration request to the AMF, and the registration request includes S-NSSAIs.

In S1002, the AMF considers the S-NSSAIs carried in the registration request and selects an NSACF based on service capabilities of the NSACF.

For details of the step S1002, reference may be made to the descriptions of the S901 in FIG. 9, which will not be repeated here.

In S1003, the AMF sends an availability check and update request (Nnsacf_NumberOfUEsPerSliceAvailabilityCheckAndUpdate_Request) message to the selected NSACF, in case that the S-NSSAI is confirmed to be included in Allowed NSSAI of the AMF.

In S1004, the NSACF performs a check and update of the number of registered UEs based on the availability check and update request message provided by the AMF.

In S1005, the NSACF feeds back an availability check and update response (Nnsacf_NumberOfUEsPerSliceAvailabilityCheckAndUpdate_Response) message to the AMF.

In S1006, the AMF performs a UE registration according to the availability check and update response message. Specifically, the S1006 may include a step S1006*a* or steps S1006*b* to S1006*c*.

In S1006*a*, the AMF rejects the registration request of the UE and returns a registration rejection message to the UE.

In S1006*b*, the AMF performs a UE registration process.

In S1006*c*, the AMF returns a registration acceptance message to the UE after completing the UE registration process.

Figure 11:
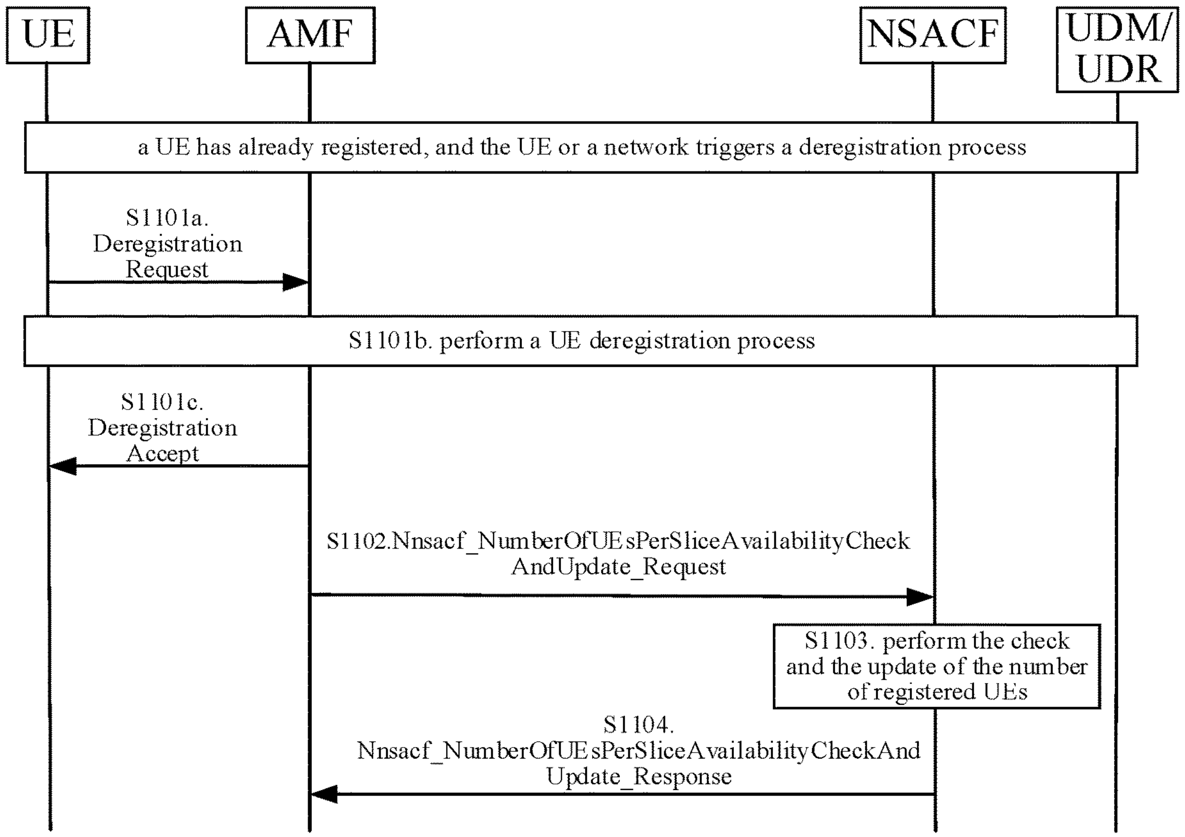
FIG. 11 is an interactive process regarding an availability check and update of a number of registered UEs in a case of UE deregistration according to embodiments of the present disclosure.

As another example, FIG. 11 shows an interactive process regarding an availability check and update of the number of registered UEs in a case of UE deregistration according to embodiments of the present disclosure. This interactive process is based on a fact that a UE has already registered to a network slice, and the UE or a network triggers a deregistration process. As shown in FIG. 11, an AMF and an NSACF interact to implement the availability check and update on the number of registered UEs. Specifically, it includes following processes.

In S1101*a*, the UE sends a deregistration request to the AMF, and the deregistration request includes S-NSSAIs.

In S1101*b*, the AMF performs a UE deregistration process.

In S1101*c*, the AMF returns a deregistration acceptance message to the UE after completing the UE deregistration process.

In S1102, the AMF sends an availability check and update request (Nnsacf_NumberOfUEsPerSliceAvailabilityCheckAndUpdate_Request) message to the selected NSACF, in case that the S-NSSAIs carried in the deregistration request is confirmed to be included in Allowed NSSAI of the AMF.

In S1103, the NSACF performs a check and update of the number of registered UEs based on the availability check and update request message provided by the AMF.

In S1104, the NSACF feeds back an availability check and update response (Nnsacf_NumberOfUEsPerSliceAvailabilityCheckAndUpdate_Response) message to the AMF.

In the above embodiments provided by the present disclosure, the methods provided in embodiments of the present disclosure are introduced from a perspective of the network device. In order to implement the various functions in the methods provided in the above embodiments of the present disclosure, the network device may include a hardware structure and a software module, and implement the above functions in a form of the hardware structure, the software module, or the hardware structure plus the software module. A certain function among the above mentioned functions may be implemented in the form of the hardware structure, the software module, or the hardware structure plus the software module.

Corresponding to the method for selecting the NSACF provided in the above embodiments, the present disclosure also provides an apparatus for selecting an NSACF. Because the apparatus for selecting the NSACF provided in embodiments of the present disclosure corresponds to the method for selecting the NSACF provided in the above embodiments, the implementations of the method for selecting the NSACF are also applicable to the apparatus for selecting the NSACF provided in embodiments here, which will not be described in detail in embodiment here.

Figure 12:
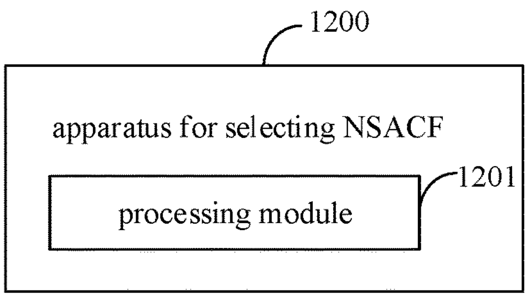
FIG. 12 is a schematic block diagram of an apparatus for selecting an NSACF according to embodiments of the present disclosure.

FIG. 12 is a schematic block diagram of an apparatus 1200 for selecting an NSACF according to embodiments of the present disclosure.

As shown in FIG. 12, the apparatus 1200 may include a processing module 1201. The processing module 1201 may select the NSACF based on service capabilities of the NSACF. The service capabilities include at least one of: a first service capability that supports monitoring a number of registered UEs of a network slice, and a second service capability that supports monitoring a number of established protocol data unit (PDU) sessions of the network slice.

With the apparatus for selecting the NSACF according to embodiments of the present disclosure, the AMF selects the NSACF for the network slice based on the service capabilities of the NSACF, and the service capabilities include the first service capability that supports monitoring the number of registered UEs of the network slice and/or the second service capability that supports monitoring the number of established protocol data unit (PDU) sessions of the network slice, so that an appropriate NSACF can be selected accurately with less signaling.

In some embodiments, the processing module 1201 is configured to: select an NSACF having the first service capability and the second service capability.

In some embodiments, the processing module 1201 is further configured to: select a high-priority NSACF from a plurality of NSACFs when the plurality of NSACFs have the first service capability and the second service capability.

In some embodiments, in case that an operator service capability policy exists, the processing module 1201 is configured to: select the NSACF according to the operator service capability policy. The operator service capability policy includes at least one of: indicating to select an NSACF having required service capabilities; and indicating to select a high-priority NSACF. The required service capabilities include only the first service capability or include the first service capability and the second service capability In some embodiments, the processing module 1201 is configured to: select the NSACF from registered NSACFs of a network repository function (NRF). Configuration information of the registered NSACFs is stored in the NRF, and the configuration information includes single-network slice selection assistance information (S-NSSAIs) and information indicating service capabilities of the registered NSACFs.

In some embodiments, the processing module 1201 is configured to: select the NSACF from preconfigured NSACFs of the AMF. Configuration information of the preconfigured NSACFs is stored in the AMF, and the configuration information includes single-network slice selection assistance information (S-NSSAIs) and information indicating service capabilities of the registered NSACFs.

In some embodiments, the operator service capability policy is preconfigured in at least one of the AMF and the NRF.

Figure 13:
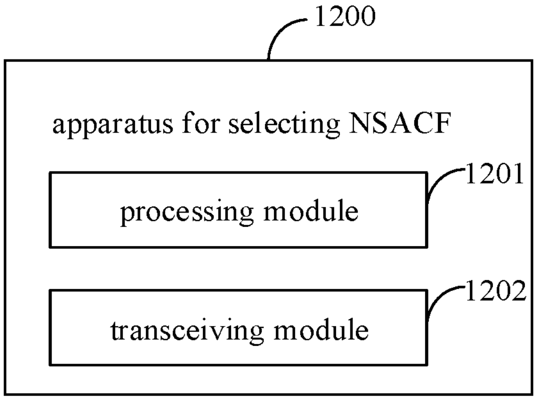
FIG. 13 is a schematic block diagram of an apparatus for selecting an NSACF according to embodiments of the present disclosure.

In some embodiments, as shown in FIG. 13, the apparatus 1200 further includes: a transceiving module 1202 configured to receive a registration request from a UE. The registration request carries the S-NSSAIs. The processing module 1201 is configured to: select the NSACF based on the service capabilities of the NSACF, in case that the S-NSSAIs carried in the registration request are included in allowed network slice selection assistance information (Allowed NSSAI) of the AMF.

In some embodiments, the transceiving module 1202 is further configured to: send an availability check and update request message to the selected NSACF; and receive an availability check and update response message from the selected NSACF. The availability check and update request message includes the S-NSSAIs, a UE identification and an update flag, and the update flag indicates to increase a number of registered UEs. The processing module 1201 is further configured to perform a UE registration according to the availability check and update response message.

In some embodiments, the processing module 1201 is configured to: perform a UE registration process and indicate the transceiving module 1202 to return a registration acceptance message to the UE after completing the UE registration process, in case that the availability check and update response message indicates that an availability check is successful, or indicate the transceiving module 1202 to return a registration rejection message to the UE, in case that the availability check and update response message indicates that an availability check is failed.

In some embodiments, the transceiving module 1202 is configured to: receive Allowed NSSAI from another AMF; and send a state update request message to the another AMF, in case that at least one S-NSSAI in the Allowed NSSAI of the another AMF is not included in Allowed NSSAI of the AMF. The state update request message includes the at least one S-NSSAI.

Figure 14:
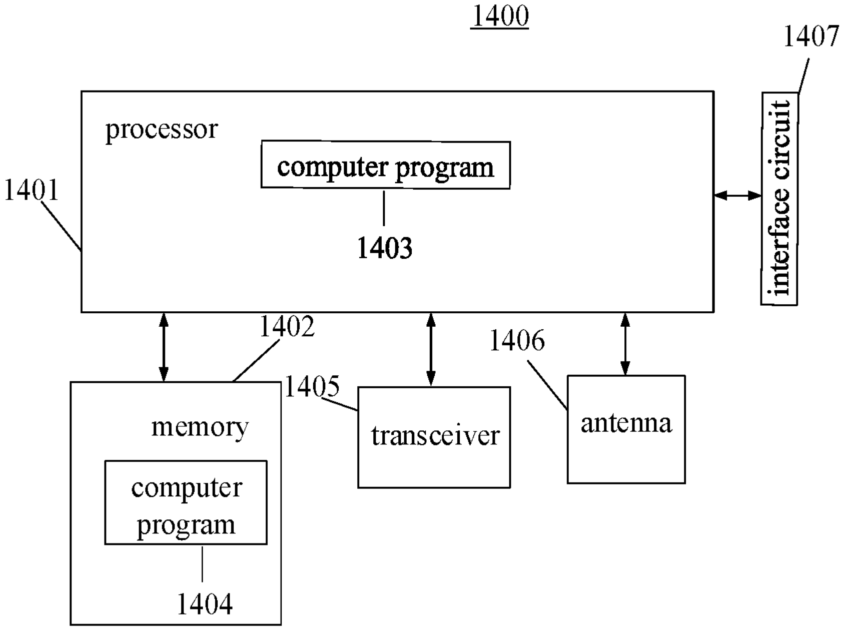
FIG. 14 is a schematic block diagram of a communication device according to embodiments of the present disclosure.

Please refer to FIG. 14, FIG. 14 is a schematic block diagram of a communication device 1400 according to embodiments of the present disclosure. The communication device 1400 may be a network device, a user equipment, or a chip, a chip system, or a processor that supports the network device to implement the above method, or may also be a chip, a chip system, or a processor that supports a terminal device to implement the above method. The device may be configured to implement the method as described in the above method embodiments, and for details, reference may be made to the descriptions on the above method embodiments.

The communications device 1400 may include one or more processors 1401. The processor 1401 may be a general-purpose processor or a special-purpose processor. For example, it may be a baseband processor or a central processing unit. The baseband processor may be configured to process a communication protocol and communication data, and the central processing unit may be configured to control a communication device (such as a base station, a baseband chip, a terminal device, a terminal device chip, a DU or a CU, etc.), execute computer programs, and process data of computer programs.

In some embodiments, the communication device 1400 may further include one or more memories 1402, which may have stored therein a computer program 1404. The processor 1401 executes the computer program 1404, to cause the communication device 1400 to implement the method as described in the above method embodiments. In some embodiments, the memory 1402 may have stored therein data. The communication device 1400 and the memory 1402 may be set separately or integrated together.

In some embodiments, the communication device 1400 may further include a transceiver 1405 and an antenna 1406. The transceiver 1405 may be called a transceiving element, a transceiving machine, a transceiving circuit or the like, for implementing a transceiving function. The transceiver 1405 may include a receiver and a transmitter. The receiver may be called a receiving machine, a receiving circuit or the like, for implementing a receiving function. The transmitter may be called a sending machine, a sending circuit or the like for implementing a sending function.

In some embodiments, the communication device 1400 may further include one or more interface circuits 1407. The interface circuit 1407 is configured to receive a code instruction and transmit the code instruction to the processor 1401. The processor 1401 runs the code instruction to enable the communication device 1400 to execute the methods as described in the foregoing method embodiments.

The communication device 1400 is the network device. The processor 1401 is configured to execute the step S101 in FIG. 1, the step S201 and the step S2011 in FIG. 2, the step S301 and the steps S3011 to S3012 in FIG. 3, the step S401 and the step S4011 in FIG. 4, the step S501 and the steps S5011 to S5012 in FIG. 5, the step S602 in FIG. 6, the step S701 and the step S703 in FIG. 7, or the step S801 in FIG. 8. The transceiver 1405 is configured to execute the step S601 in FIG. 6, the step S702 in FIG. 7, or the steps S802 to S803 in FIG. 8.

In an implementation manner, the processor 1401 may include the transceiver configured to implement receiving and sending functions. For example, the transceiver may be a transceiving circuit, an interface, or an interface circuit. The transceiving circuit, the interface or the interface circuit configured to implement the receiving and sending functions may be separated or may be integrated together. The above transceiving circuit, interface or interface circuit may be configured to read and write codes/data, or the above transceiving circuit, interface or interface circuit may be configured to transmit or transfer signals.

In an implementation manner, the processor 1401 may has stored therein a computer program 1403 that, when run on the processor 1401, causes the communication device 1400 to implement the method as described in the foregoing method embodiments. The computer program 1403 may be solidified in the processor 1401, and in this case, the processor 1401 may be implemented by a hardware.

In an implementation manner, the communication device 1400 may include a circuit, and the circuit may implement the sending, receiving or communicating function in the foregoing method embodiments. The processor and the transceiver described in the present disclosure may be implemented on an integrated circuit (IC), an analog IC, a radio frequency integrated circuit (RFIC), a mixed-signal IC, an application specific integrated circuit (ASIC), a printed circuit board (PCB), an electronic device, etc. The processor and the transceiver may also be manufactured using various IC process technologies, such as a complementary metal oxide semiconductor (CMOS), an nMetal-oxide-semiconductor (NMOS), a positive channel metal oxide semiconductor (PMOS), a bipolar junction transistor (BJT), a bipolar CMOS (BiCMOS), silicon germanium (SiGe), gallium arsenide (GaAs), etc.

The communication device described in the above embodiments may be the network device or the terminal device (such as the first terminal device in the foregoing method embodiments), but the scope of the communication device described in the present disclosure is not limited thereto, and a structure of the communication device is not limited by FIG. 14. The communication device may be a stand-alone device or may be a part of a larger device. For example, the communication device may be:

(1) a stand-alone integrated circuit (IC), or a chip, or a chip system or a subsystem;

(2) a set of one or more ICs, optionally, the set of ICs may also include a storage component for storing data and computer programs;

(3) an ASIC, such as a modem;

(4) a module that may be embedded in other devices;

(5) a receiver, a terminal device, an intelligent terminal device, a cellular phone, a wireless device, a handheld machine, a mobile unit, a vehicle device, a network device, a cloud device, an artificial intelligence device, etc.;

(6) others.

Figure 15:
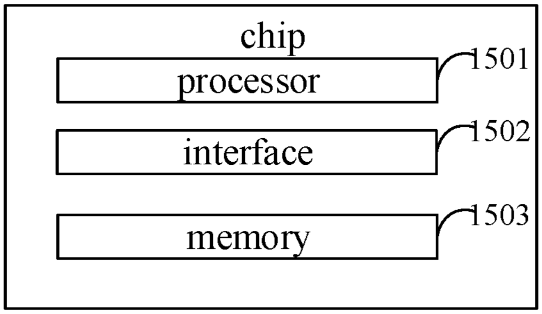
FIG. 15 is a schematic block diagram of a chip according to embodiments of the present disclosure.

For the case where the communication device may be a chip or a chip system, reference may be made to a schematic structural diagram of a chip shown in FIG. 15. The chip shown in FIG. 15 includes a processor 1501 and an interface 1502. In the chip, one or more processors 1501 may be provided, and more than one interface 1502 may be provided.

For the case where the chip is used to implement functions of the network device in embodiments of the present disclosure, the processor 1501 is configured to execute the step S101 in FIG. 1, the step S201 and the step S2011 in FIG. 2, the step S301 and the steps S3011 to S3012 in FIG. 3, the step S401 and the step S4011 in FIG. 4, the step S501 and the steps S5011 to S5012 in FIG. 5, the step S602 in FIG. 6, the step S701 and the step S703 in FIG. 7, or the step S801 in FIG. 8; and the interface 1502 is configured to execute the step S601 in FIG. 6, the step S702 in FIG. 7, or the steps S802 to S803 in FIG. 8.

In some embodiments, the chip further includes a memory 1503 for storing necessary computer programs and data.

Those skilled in the art may also understand that various illustrative logical blocks and steps listed in embodiments of the present disclosure may be implemented by an electronic hardware, a computer software, or a combination thereof. Whether such functions are implemented by a hardware or a software depends on specific applications and design requirements of an overall system. For each specific application, those skilled in the art may use various methods to implement the described functions, but such implementation should not be understood as beyond the protection scope of embodiments of the present disclosure.

The present disclosure also provides a readable storage medium having stored thereon instructions that, when executed by a computer, cause functions of any of the above method embodiments to be implemented.

The present disclosure also provides a computer program product that, when executed by a computer, causes functions of any of the above method embodiments to be implemented.

The above embodiments may be implemented in whole or in part by a software, a hardware, a firmware or any combination thereof. When implemented using the software, the above embodiments may be implemented in whole or in part in a form of the computer program product. The computer program product includes one or more computer programs. When the computer program is loaded and executed on the computer, all or part of the processes or functions according to embodiments of the present disclosure will be generated. The computer may be a general purpose computer, a special purpose computer, a computer network, or other programmable devices. The computer program may be stored in a computer-readable storage medium or transmitted from one computer-readable storage medium to another computer-readable storage medium. For example, the computer program may be transmitted from one website, computer, server or data center to another website site, computer, server or data center by a wired manner (such as via a coaxial cable, an optical fiber, a digital subscriber line (DSL)) or a wireless manner (such as infrared, wireless, or via microwave, etc.). The computer-readable storage medium may be any available medium that can be accessed by the computer, or a data storage device such as the server or the data center integrated with one or more available media. The available medium may be a magnetic medium (for example, a floppy disk, a hard disk, or a magnetic tape), an optical medium (for example, a high-density digital video disc (DVD)), or a semiconductor medium (for example, a solid state disk (SSD)) etc.

Those of ordinary skill in the art can understand that the first, second, and other numeral numbers involved in the present disclosure are only for convenience of description, and are not intended to limit the scope of embodiments of the present disclosure, and nor are they intended to represent sequential order.

The term "at least one" used in the present disclosure may also be described as one or more, and the term "a plurality of" may cover two, three, four or more, which are not limited in the present disclosure. In embodiments of the present disclosure, for a certain kind of technical feature, the technical features in this kind of technical feature are distinguished by term like "first", "second", "third", "A", "B", "C" and "D", etc., and these technical features described with the "first", "second", "third", "A", "B", "C" and "D" have no order of priority and have no order of size.

As used herein, the terms "machine-readable medium" and "computer-readable medium" refer to any computer program product, device, and/or apparatus (for example, a magnetic disk, an optical disk, a memory, a programmable logic device (PLD)) configured to provide machine instructions and/or data to a programmable processor, and includes machine-readable media that receive the machine instructions as machine-readable signals. The term "machine-readable signal" refers to any signal configured to provide the machine instructions and/or the data to the programmable processor.

The system and technique described herein may be implemented in a computing system that includes back-end components (for example, as a data server), or a computing system that includes middleware components (for example, an application server), or a computing system that includes front-end components (for example, a user computer having a graphical user interface or a web browser through which a user may interact with implementations of the system and technique described herein), or a computing system including any combination of such back-end components, middleware components, or front-end components. The components of the system may be interconnected by any form or medium of a digital data communication (for example, a communication network). Examples of the communication network include: a local area network (LAN), a wide area network (WAN), and an Internet.

A computer system may include a client and a server. The client and the server are generally remote from each other and typically interact via the communication network. A relationship of the client and the server is generated by the computer program running on a corresponding computer and having a client-server relationship with each other.

It should be understood that various forms of the process shown above may be used, with steps reordered, added or deleted. For example, various step described in the present disclosure may be executed in parallel, sequentially, or in a different order. As long as the desired results of the technical solutions disclosed in the present disclosure can be achieved, there is no limitation thereto.

In addition, it should be understood that the various embodiments described in the present disclosure may be implemented alone or in combination with other embodiments if the scheme allows.

Those of ordinary skill in the art can appreciate that the units and algorithm steps of various examples described in conjunction with embodiments disclosed herein may be implemented by the electronic hardware, or a combination of the computer software and the electronic hardware. Whether these functions are executed by the hardware or the software depends on the specific applications and design constraints of the technical solution. For each particular application, those skilled in the art may use different methods to implement the described functions, but such implementation should not be considered beyond the scope of the present disclosure.

Those skilled in the art can clearly understand that for the convenience and brevity of the description, the specific working process of the above-described system, device and unit may refer to the corresponding process in the foregoing method embodiments, which will not be repeated here.

The above only describes some specific implementations of the present disclosure, but the protection scope of the present disclosure is not limited thereto. Any changes or substitutions that are conceivable to those skilled in the art within the technical scope of the present disclosure should fall within the protection scope of the present disclosure. Therefore, the protection scope of the present disclosure should be determined by the protection scope of the claims.

What is claimed is:

1. A method for selecting a network slice admission control function (NSACF), performed by an access and mobility management function (AMF), comprising:

selecting the NSACF based on service capabilities of the NSACF;

wherein the service capabilities comprise at least one of:

a first service capability that supports monitoring a number of registered user equipments (UEs) of a network slice, or a second service capability that supports monitoring a number of established protocol data unit (PDU) sessions of the network slice;

in case that an operator service capability policy exists, selecting the NSACF comprises:

selecting the NSACF according to the operator service capability policy;

wherein the operator service capability policy comprises one of:

indicating to select an NSACF having required service capabilities, wherein the required service capabilities comprise only the first service capability or comprise the first service capability and the second service capability;

indicating to select a high-priority NSACF;

indicating to select an NSACF having the first service capability and a high priority; or indicating to select an NSACF having the first and second service capabilities and a high priority.

2. The method according to claim 1, wherein selecting the NSACF comprises one of:

selecting an NSACF having the first service capability and the second service capability; or selecting a high-priority NSACF from a plurality of NSACFs when the plurality of NSACFs have the first service capability and the second service capability.

3. The method according to claim 1, wherein selecting the NSACF comprises:

selecting the NSACF from registered NSACFs of a network repository function (NRF), wherein configuration information of the registered NSACFs is stored in the NRF, and the configuration information comprises single-network slice selection assistance information (S-NSSAIs) and information indicating service capabilities of the registered NSACFs.

4. The method according to claim 1, wherein selecting the NSACF comprises:

selecting the NSACF from preconfigured NSACFs of the AMF, wherein configuration information of the preconfigured NSACFs is stored in the AMF, and the configuration information comprises single-network slice selection assistance information (S-NSSAIs) and information indicating service capabilities of the registered NSACFs.

5. The method according to claim 1, further comprising:

receiving a registration request from a UE, wherein the registration request carries single-network slice selection assistance information (S-NSSAIs);

wherein selecting the NSACF based on the service capabilities of the NSACF comprises:

selecting the NSACF based on the service capabilities of the NSACF, in case that the S-NSSAIs carried in the registration request are comprised in allowed network slice selection assistance information (Allowed NSSAI) of the AMF.

6. The method according to claim 5, further comprising:

sending an availability check and update request message to the selected NSACF, wherein the availability check and update request message comprises the S-NSSAIs, a UE identification and an update flag, the update flag indicating to increase a number of registered UEs; and receiving an availability check and update response message from the selected NSACF, and performing a UE registration according to the availability check and update response message.

7. The method according to claim 6, wherein performing the UE registration according to the availability check and update response message comprises:

performing a UE registration process and returning a registration acceptance message to the UE after completing the UE registration process, in case that the availability check and update response message indicates that an availability check is successful, or returning a registration rejection message to the UE, in case that the availability check and update response message indicates that an availability check is failed.

8. The method according to claim 1, further comprising:

receiving allowed network slice selection assistance information (Allowed NSSAI) from another AMF; and sending a state update request message to the another AMF, in case that at least one single-network slice selection assistance information (S-NSSAI) in the Allowed NSSAI of the another AMF is not comprised in Allowed NSSAI of the AMF, wherein the state update request message comprises the at least one S-NSSAI.

9. A communication device, comprising:

a transceiver;

a memory; and a processor, wherein the processor is configured to:

select a network slice admission control function (NSACF) based on service capabilities of the NSACF;

wherein the service capabilities comprise at least one of:

a first service capability that supports monitoring a number of registered user equipments (UEs) of a network slice, or a second service capability that supports monitoring a number of established protocol data unit (PDU) sessions of the network slice, in case that an operator service capability policy exists, the processor is configured to:

select the NSACF according to the operator service capability policy;

wherein the operator service capability policy comprises one of:

indicating to select an NSACF having required service capabilities, wherein the required service capabilities comprise only the first service capability or comprise the first service capability and the second service capability;

indicating to select a high-priority NSACF;

indicating to select an NSACF having the first service capability and a high priority; or indicating to select an NSACF having the first and second service capabilities and a high priority.

10. The communication device according to claim 9, wherein the processor is configured to:

select an NSACF having the first service capability and the second service capability; or select a high-priority NSACF from a plurality of NSACFs when the plurality of NSACFs have the first service capability and the second service capability.

11. The communication device according to claim 9, wherein the processor is configured to:

select the NSACF from registered NSACFs of a network repository function (NRF), wherein configuration information of the registered NSACFs is stored in the NRF, and the configuration information comprises single-network slice selection assistance information (S-NSSAIs) and information indicating service capabilities of the registered NSACFs.

12. The communication device according to claim 9, wherein the processor is configured to:

select the NSACF from preconfigured NSACFs of an access and mobility management function (AMF), wherein configuration information of the preconfigured NSACFs is stored in the AMF, and the configuration information comprises single-network slice selection assistance information (S-NSSAIs) and information indicating service capabilities of the registered NSACFs.

13. The communication device according to claim 9, wherein the processor is further configured to:

receive a registration request from a UE, wherein the registration request carries single-network slice selection assistance information (S-NSSAIs); and select the NSACF based on the service capabilities of the NSACF, in case that the S-NSSAIs carried in the registration request are comprised in allowed network slice selection assistance information (Allowed NSSAI) of an access and mobility management function (AMF).

14. The communication device according to claim 13, wherein the processor is further configured to:

send an availability check and update request message to the selected NSACF, wherein the availability check and update request message comprises the S-NSSAIs, a UE identification and an update flag, the update flag indicating to increase a number of registered UEs; and receive an availability check and update response message from the selected NSACF, and performing a UE registration according to the availability check and update response message.

15. The communication device according to claim 14, wherein the processor is further configured to:

perform a UE registration process and return a registration acceptance message to the UE after completing the UE registration process, in case that the availability check and update response message indicates that an availability check is successful, or return a registration rejection message to the UE, in case that the availability check and update response message indicates that an availability check is failed.

16. The communication device according to claim 9, wherein the processor is further configured to:

receive allowed network slice selection assistance information (Allowed NSSAI) from another AMF; and send a state update request message to the another AMF, in case that at least one single-network slice selection assistance information (S-NSSAI) in the Allowed NSSAI of the another AMF is not comprised in Allowed NSSAI of the AMF, wherein the state update request message comprises the at least one S-NSSAI.

17. A non-transitory computer readable storage medium having stored therein computer-executable instructions that, when executed by a processor, cause the processor to:

select a network slice admission control function (NSACF) based on service capabilities of the NSACF;

wherein the service capabilities comprise at least one of:

a first service capability that supports monitoring a number of registered user equipments (UEs) of a network slice, or a second service capability that supports monitoring a number of established protocol data unit (PDU) sessions of the network slice;

wherein the instructions that, when executed by a processor, cause the processor to:

select the NSACF according to an operator service capability policy, in case that the operator service capability policy exists, wherein the operator service capability policy comprises one of:

indicating to select an NSACF having required service capabilities, wherein the required service capabilities comprise only the first service capability or comprise the first service capability and the second service capability;

indicating to select a high-priority NSACF;

indicating to select an NSACF having the first service capability and a high priority; or indicating to select an NSACF having the first and second service capabilities and a high priority.

18. The non-transitory computer readable storage medium according to claim 17, wherein the computer-executable instructions that, when executed by a processor, cause the processor to:

select an NSACF having the first service capability and the second service capability; or select a high-priority NSACF from a plurality of NSACFs when the plurality of NSACFs have the first service capability and the second service capability.

19. The non-transitory computer readable storage medium according to claim 17, wherein the computer-executable instructions that, when executed by a processor, cause the processor to:

select the NSACF from registered NSACFs of a network repository function (NRF), wherein configuration information of the registered NSACFs is stored in the NRF, and the configuration information comprises single-network slice selection assistance information (S-NSSAIs) and information indicating service capabilities of the registered NSACFs.

20. The non-transitory computer readable storage medium according to claim 17, wherein the computer-executable instructions that, when executed by a processor, cause the processor to:

select the NSACF from preconfigured NSACFs of an AMF, wherein configuration information of the preconfigured NSACFs is stored in the AMF, and the configuration information comprises single-network slice selection assistance information (S-NSSAIs) and information indicating service capabilities of the registered NSACFs.

* * * * *